United States Patent
Wang et al.

(10) Patent No.: US 10,386,899 B2
(45) Date of Patent: Aug. 20, 2019

(54) METHODS AND SYSTEMS FOR CONFIGURABLE TEMPERATURE CONTROL OF CONTROLLER PROCESSORS

(71) Applicant: GM GLOBAL TECHNOLOGY OPERATIONS LLC, Detroit, MI (US)

(72) Inventors: Shige Wang, Northville, MI (US); Mark A. Zerbini, Canton, MI (US); Unmesh Dutta Bordoloi, Troy, MI (US); Soheil Samii, Royal Oak, MI (US); Massimo Osella, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/671,283

(22) Filed: Aug. 8, 2017

(65) Prior Publication Data

US 2019/0050032 A1    Feb. 14, 2019

(51) Int. Cl.
G06F 1/20    (2006.01)
G06F 1/26    (2006.01)
G06F 11/30   (2006.01)

(52) U.S. Cl.
CPC .............. *G06F 1/206* (2013.01); *G06F 1/26* (2013.01); *G06F 11/3024* (2013.01); *G06F 11/3058* (2013.01)

(58) Field of Classification Search
CPC .......... G06F 11/3024; G06F 11/3058
See application file for complete search history.

(56) References Cited

U.S. PATENT DOCUMENTS

| | | | |
|---|---|---|---|
| 5,974,557 A | 10/1999 | Thomas et al. | |
| 6,076,964 A * | 6/2000 | Wu | G01K 7/42 374/134 |
| 6,198,245 B1 * | 3/2001 | Du | G01K 7/42 318/471 |
| 6,286,366 B1 * | 9/2001 | Chen | F02D 41/32 73/114.31 |
| 6,349,385 B1 * | 2/2002 | Kaminski | G06F 1/206 713/300 |
| 7,054,720 B2 | 5/2006 | Cooper | |
| 7,075,421 B1 * | 7/2006 | Tuttle | B60C 23/04 152/152.1 |

(Continued)

FOREIGN PATENT DOCUMENTS

| | | |
|---|---|---|
| CN | 101356486 A | 1/2009 |
| CN | 103631351 A | 3/2014 |
| CN | 104160357 A | 11/2014 |

OTHER PUBLICATIONS

USPTO, Office Action in U.S. Appl. No. 15/056,658 dated Feb. 9, 2018.

(Continued)

*Primary Examiner* — Behrang Badii
*Assistant Examiner* — Daniel L Greene
(74) *Attorney, Agent, or Firm* — Lorenz & Kopf, LLP (57) ABSTRACT

Methods and systems are provided for controlling a temperature of a processor of a controller. In one embodiment, a method includes: identifying a status of at least one task of a plurality of software tasks performed on a first processor to be a hot task based on the software task's contribution to a temperature of the first processor; and selectively controlling the temperature of the first processor based on the identified status.

16 Claims, 7 Drawing Sheets

(56) References Cited

U.S. PATENT DOCUMENTS

| | | | |
|---|---|---|---|
| 7,761,723 B2 | 7/2010 | Greiner et al. | |
| 7,886,164 B1 | 2/2011 | Alben et al. | |
| 8,612,066 B2 * | 12/2013 | O'Neal | B60W 30/184 318/580 |
| 9,595,083 B1 | 3/2017 | Smith et al. | |
| 2004/0267894 A1 * | 12/2004 | Zaharias | G06F 9/4405 709/215 |
| 2009/0073731 A1 * | 3/2009 | Phadke | G01R 31/343 363/74 |
| 2010/0030395 A1 * | 2/2010 | Shimotono | G06F 1/206 700/300 |
| 2015/0293756 A1 * | 10/2015 | Wright | G06F 11/3096 717/178 |
| 2017/0074729 A1 | 3/2017 | Coutts et al. | |

OTHER PUBLICATIONS

State Intellecutal Property Office of the Peoples Republic of China, Office Action in Chinese Patent Application No. 201710105952.3 dated Jun. 21, 2018.

* cited by examiner

METHODS AND SYSTEMS FOR CONFIGURABLE TEMPERATURE CONTROL OF CONTROLLER PROCESSORS

TECHNICAL FIELD

The technical field generally relates to controllers, and more particularly to methods and systems for controlling a temperature of a controller processor.

BACKGROUND

Controllers control the operation of one or more components of a system. For example, vehicle controllers control one or more components of a vehicle via associated actuators. Generally, a vehicle controller includes a control program that includes instructions that are performed by a processor for controlling the operation of the component. In some instances, the processor of the controller may overheat due to overuse or environmental conditions. Overheating of the processor may shorten the processor's lifetime and can cause computations performed by the processor to be unreliable. In some instances, a controller includes more than one processor, for example, a backup processor.

Accordingly, it is desirable to provide methods and systems for controlling a temperature of a controller processor using the backup processor. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for controlling a temperature of a processor of a controller. In one embodiment, a method includes: identifying a status of at least one task of a plurality of software tasks performed on a first processor to be a hot task based on the software task's contribution to a temperature of the first processor; and selectively controlling the temperature of the first processor based on the identified status.

In one embodiment, a system includes a non-transitory computer readable medium. The non-transitory computer readable medium includes a first module that identifies a status of at least one task of a plurality of software tasks performed on a first processor to be a hot task based on the software task's contribution to a temperature of the first processor. The non-transitory computer readable medium further includes a second module that selectively controls the temperature of the first processor based on the identified status.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of control systems, and that the vehicle system described herein is merely one example embodiment.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

Figure 1:
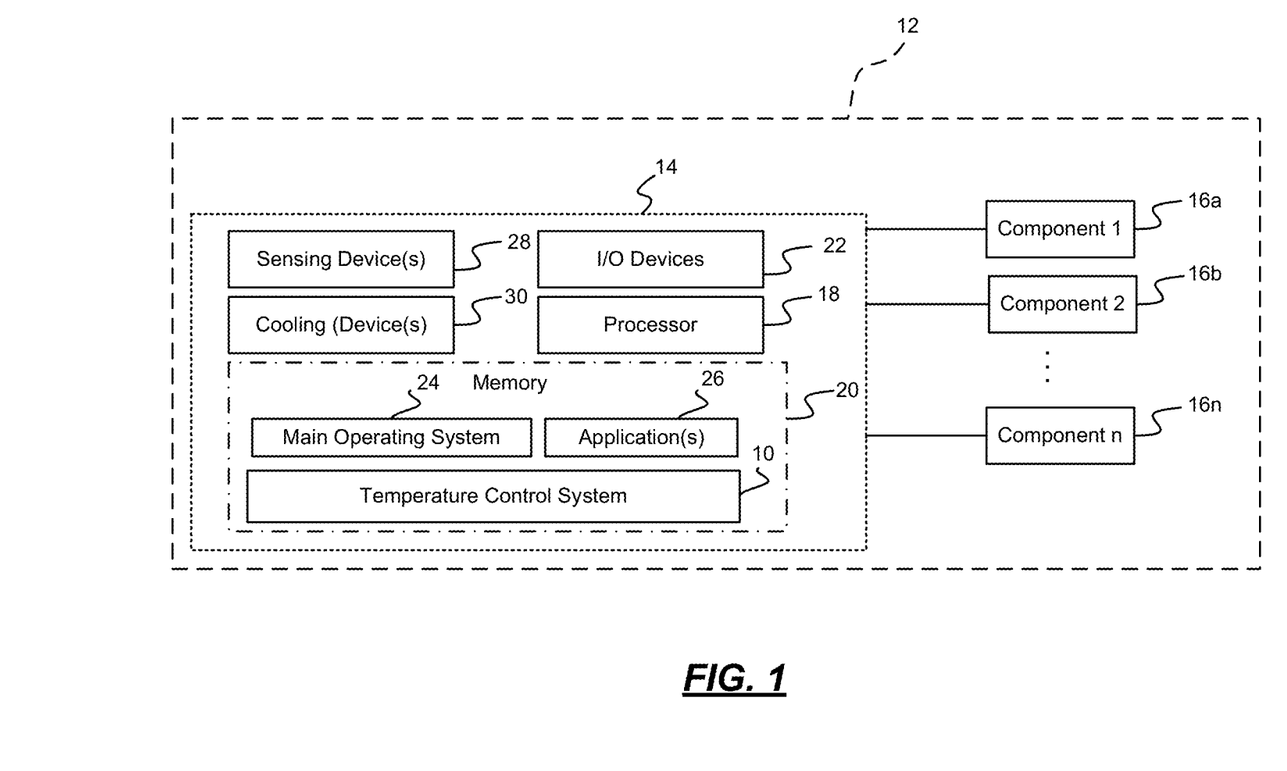
FIG. 1 is a functional block diagram of a vehicle that includes a controller having a temperature control system in accordance with various embodiments.
Figure 2:
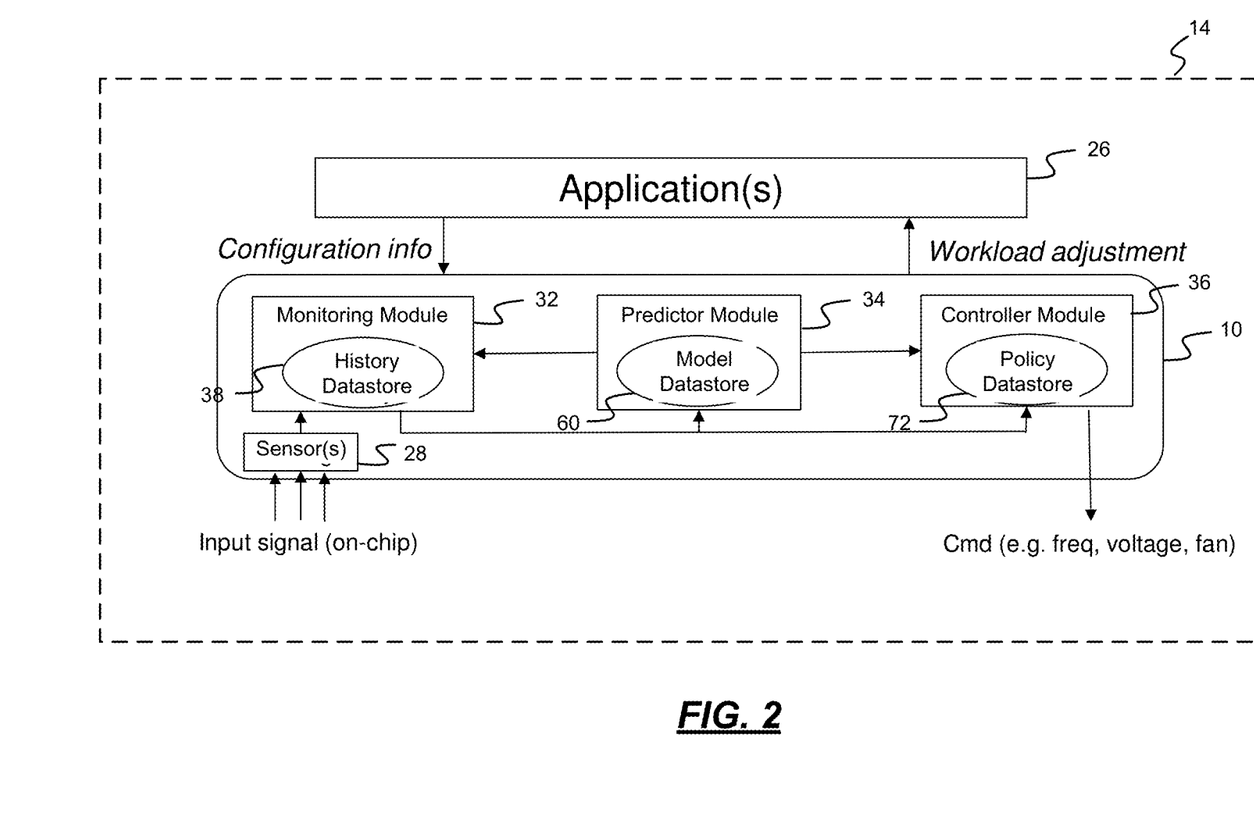
FIGS. 2 through 5 are dataflow diagrams illustrating the temperature control system in accordance with various embodiments.

With reference now to FIG. 1, an exemplary temperature control system 10 is shown to be associated with a vehicle 12. As can be appreciated, the vehicle 12 may be any vehicle type such as, but not limited to a road vehicle, an off-road vehicle, an aircraft, a watercraft, a train, etc. As can further be appreciated, the temperature control system 10 may be associated with non-vehicle applications having a controller that controls one or more components. Although the figures shown herein depict an example with certain arrangements of elements, additional intervening elements, devices, features, or components may be present in actual embodiments. It should also be understood that FIG. 1 is merely illustrative and may not be drawn to scale.

As shown, the vehicle 12 includes a controller 14. The controller 14 controls one or more components 16a-16n of the vehicle 12. The controller 14 includes at least two processors 18 (e.g., a main processor 18a and a backup processor 18b), memory 20, one or more input and/or output (I/O) devices 22, one or more sensing devices 28, and one or more cooling devices 30. The I/O devices 22 communicate with one or more sensors and/or actuators associated with the components 16a-16n of the vehicle 12 to control the components 16a-16n. The sensing devices 28 sense observable conditions associated with the processor 18 and generate sensor signals based thereon. The cooling devices 30 are controlled to cool the processor 18, for example, by fan or other means.

The memory 20 stores instructions that can be performed by the processors 18. The instructions stored in memory 20 may include one or more separate programs, each of which comprises an ordered listing of executable instructions for implementing logical functions. In the example of FIG. 1, the instructions stored in the memory 20 are part of a main operating system (MOS) 24 and one or more applications 26. The applications 26 include the logic for controlling the one or more components 16a-16n. The main operating system 24 includes logic for controlling the performance of the applications 26 and provides scheduling, input-output control, file and data management, memory management, and communication control and related services. In various embodiments, the instructions further include the temperature control system 10 herein described.

When the controller 14 is in operation, the processors 18 are configured to execute the instructions stored within the memory 20, to communicate data to and from the memory 20, and to generally control operations of the vehicle 12 pursuant to the instructions. The processors 18 can be any custom made or commercially available processor, a central processing unit (CPU), an auxiliary processor among several processors associated with the controller 14, a semiconductor based microprocessor (in the form of a microchip or chip set), a macroprocessor, or generally any device for executing instructions.

In various embodiments, at least one of the processors 18 execute the instructions of the temperature control system 10. The temperature control system 10 generally monitors and collects data measured by the sensing device(s) 28. The temperature control system 10 processes the data to predict a temperature of the processor 18 and/or a rate of change of temperature associated with the processor 18. The temperature control system 10 controls the temperature of the processor 18 based on the predicted temperature and/or rate of change of temperature. In various embodiments, the temperature control system 10 further controls the temperature of the processor 18 by identifying a status of processor tasks to be one of 'hot' or 'cool' and selectively directing the processor tasks to the main processor 18a or the backup processor 18b based on the identified status. In various embodiments, the status of each task is identified as hot or cool based on the task's contribution to the temperature of the processor. Software modules running on a processor impact have different thermal impacts depending on the demand of processor activity from the software modules. 'Hot' tasks are the software tasks that lead to high temperatures on the processor and the memory. High temperatures are those at which the undesired effects, like thermal throttling kicks in on the processor under consideration. 'Cool' tasks are the software tasks that do not lead to high temperatures on the processor and, if the temperature is high, brings down the temperature provided no 'hot' tasks are running on the same processor.

Referring now to FIGS. 2-5 and with continued reference to FIG. 1, dataflow diagrams illustrate the temperature control system 10 in more detail in accordance with various exemplary embodiments. As can be appreciated, various exemplary embodiments of the temperature control system 10, according to the present disclosure, may include any number of modules and/or sub-modules. In various exemplary embodiments, the modules and sub-modules shown in FIGS. 2-5 may be combined and/or further partitioned to similarly monitor and control a temperature of the processor 18. In various embodiments, the temperature control system 10 receives inputs from the one or more sensing devices 28, and/or the application(s) 26. In various embodiments, the temperature control system 10 generates output signals to the one or more cooling devices 30 and/or the application(s) 26. In various exemplary embodiments, the temperature control system 10 includes a monitoring module 32, a predictor module 34, and a controller module 36.

The monitoring module 32 collects and stores measurement data to support the prediction of the temperature and the control of the temperature. The measurement data is stored in a history datastore 38. For example, as shown in greater detail in FIG. 3, measurement data 40 may be provided by the sensing devices 28 of the controller 14 and can include data from a temperature sensor, performance registers, mode registers, etc. The monitoring module 32 collects multiple measurements in a time correlated way. For example, a time-series of measurement data 40 is collected, the data of the time-series is formatted into one or more data structures at 42, and stored in the history datastore 38.

Figure 3:
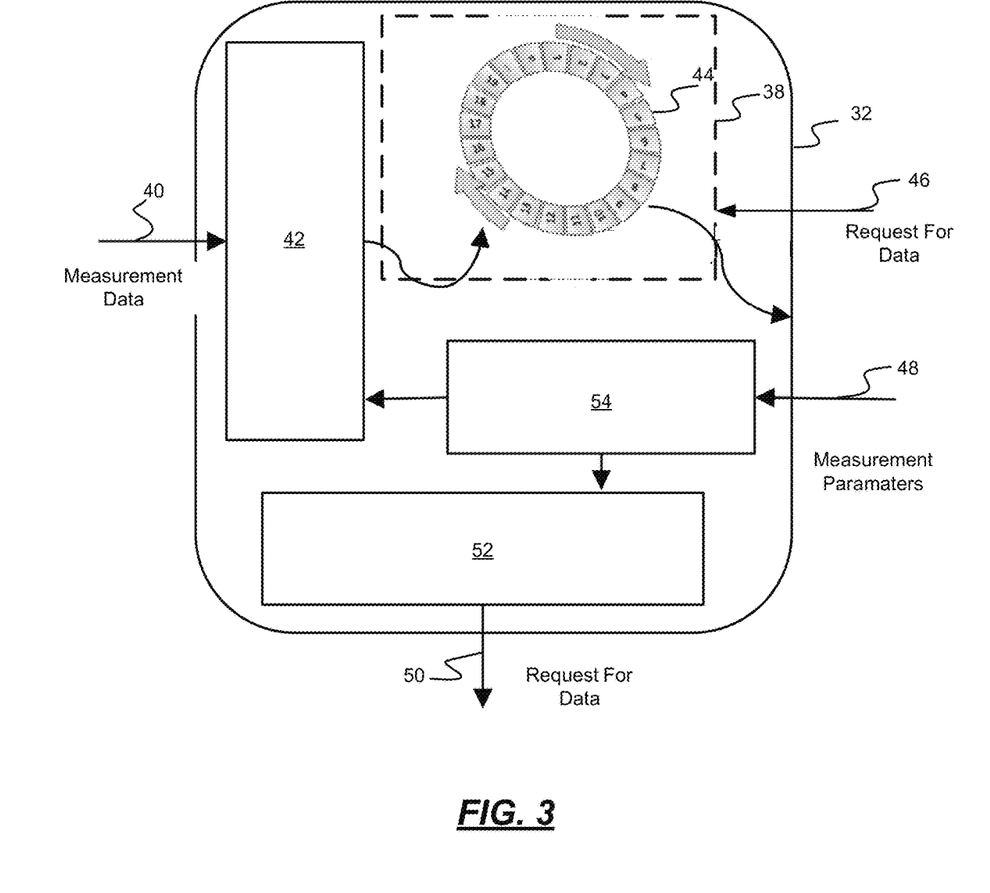

In various embodiments, the history datastore 38 includes a circular buffer 44. The size of the circular buffer 44 and the format of data structures stored in each can be configured. In such embodiments, the monitoring module 32 tracks an index associated with the circular buffer 44. For example, after receiving the measurement data 40 and formatting the measurement data 40 into a data structure, the monitoring module 32 stores the data structure in the circular buffer 44 at allocation associated with the index and then increments the index to the next write position in the circular buffer 44. Once the index reaches the last location in the circular buffer 44, the monitoring module 32 sets the index to the index value associated with the first location. In this manner, once the circular buffer 44 is full, the oldest data is overwritten first.

In another example, after receiving a request 46 to receive data from the history datastore 38, the monitoring module 32 retrieves the data structures associated with the indexes between: index-1 and (index-1)-count, where the count is assumed to be less than the buffer size. The count can be configurable, for example based on the predictor model used by the predictor module 34 (as will be described in more detail below).

In various embodiments, how the data is collected and what data is collected by the monitoring module 32 is configurable. For example, the monitoring module 32 may receive measurement parameters 48 from the predictor module 34 (i.e., based on the predictor model used for the prediction) at 54; and the monitoring module 32 generates a request for the data 50 based on the parameters 48 at 52. The monitoring module 32 further formats the measurement data 40 at 42 based on the measurement parameters 48. For example, the measurement parameters 48 may include, but are not limited to, an indication of direct measurement by way of the temperature sensor, an indication of indirect measurement by way of task level or hardware level sensing (e.g., instruction cycles, cache miss/hit, etc.), uniform sampling, and/or non-uniform sampling.

With reference back to FIG. 2, the predictor module 34 computes a temperature of the processors 18 and computes rate of change of the temperature (e.g., how quickly the temperature changes). The predictor module 34 computes the temperature and how quickly the temperature changes based on one or more predictor models stored in a model datastore 60. For example, as shown in more detail in FIG. 4, the model datastore 60 stores one or more predictor models 62. The predictor module 34 selects which predictor model 62 to execute at 64.

Figure 4:
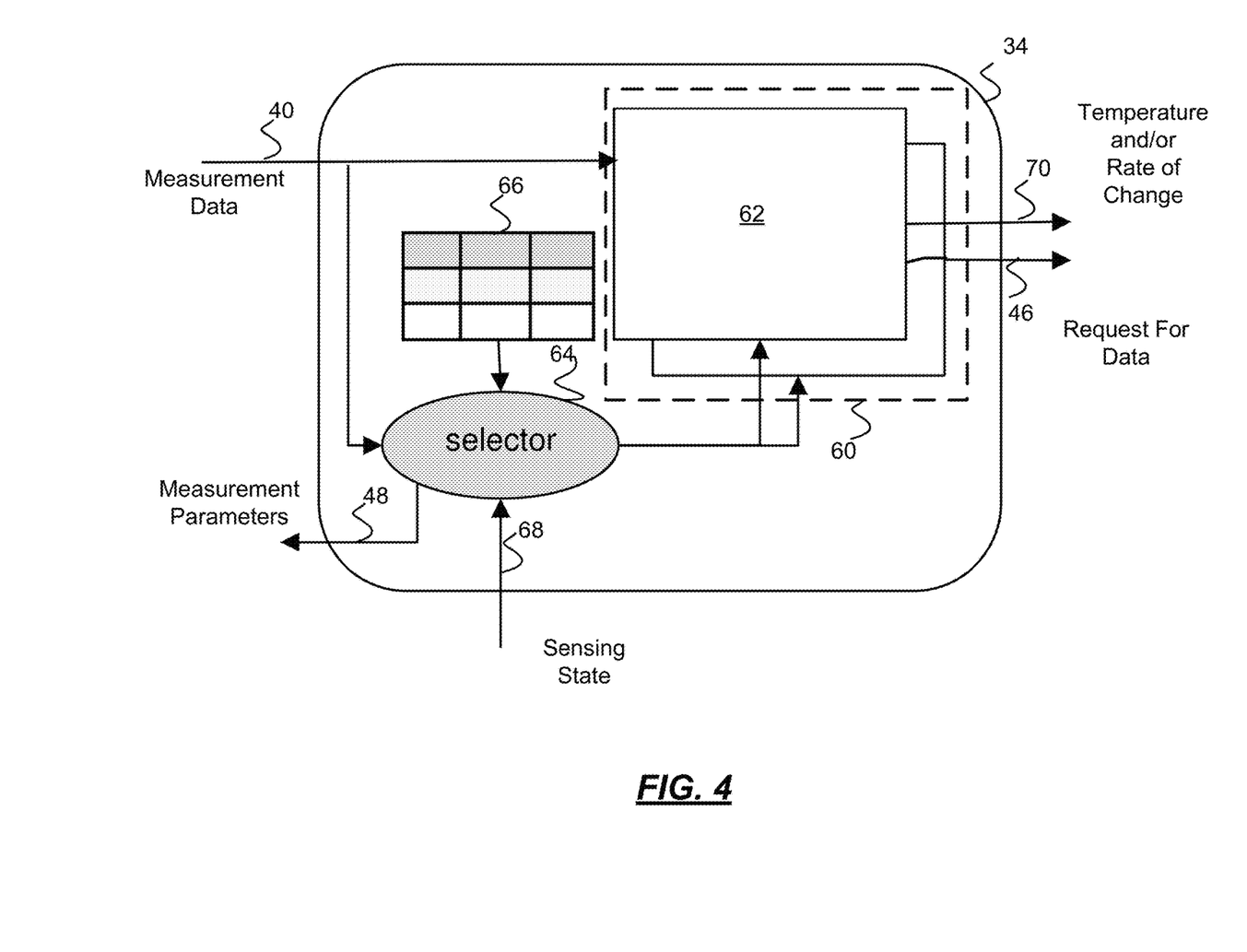

For example, the temperature of the processor 18 typically depends on two factors: processor thermal characteristics related to heat transfer and materials (fixed), and application thermal characteristics related to instructions per time unit, memory access, I/O access, etc. The predictor module 34 receives and evaluates current measurement data 40 to select which predictor model to execute.

The predictor module 34 selects the predictor model 62 that would be best suitable for prediction based on the conditions indicated by the current measurement data 40. For example, the predictor module 34 includes a table 66 with structures such as: <current_temperature, current_workload, sensing_state, measure_conf. The predictor module 34 evaluates the table 66 to decide which predictor model 62 to use and the corresponding measurement parameters 48 to use to measure the data (e.g., current_temp and current_workload from measurement). In various embodiments, the predictor module 34 determines the predictor model 62 to be used based on a current sensing state 68 associated with system services (e.g. diagnostic, indicating availability of sensing devices).

The selected predictor model 62 is then executed by the predictor module 34. The predictor model 62 requests measurements from the monitoring module 32 via the request for data 46 based on the measurement parameters 48. The predictor module 34 then processes the received measurement data 40 using the selected predictor model 62 to generate the predicted temperature and/or the rate of change of the temperature 70. Example predictor models 62 can include, but are not limited to, regressive moving average for uniform temperature measurement:

$$T_t = e_{t-1} + \Sigma_{i=1}^{q}(c_i e_{t-i}) - \Sigma_{i=1}^{p}(a_i T_{t-i}), \text{ and} \tag{1}$$

a band limited temperature frequency uniform workload, non-uniform temperature measurement:

$$T_t = \frac{1}{\sqrt{1 + (wc)^2}} F(U_{t-1}) \tag{2}$$

With reference back to FIG. 2, the controller module 36 determines if action is necessary based on the predicted temperature and/or rate of change of the temperature 70, and if action is necessary, controls the actions to achieve a desired operating temperature. In various embodiments, the controller module 36 determines the actions and controls the actions based one or more policies stored in a policy datastore 72.

Figure 5:
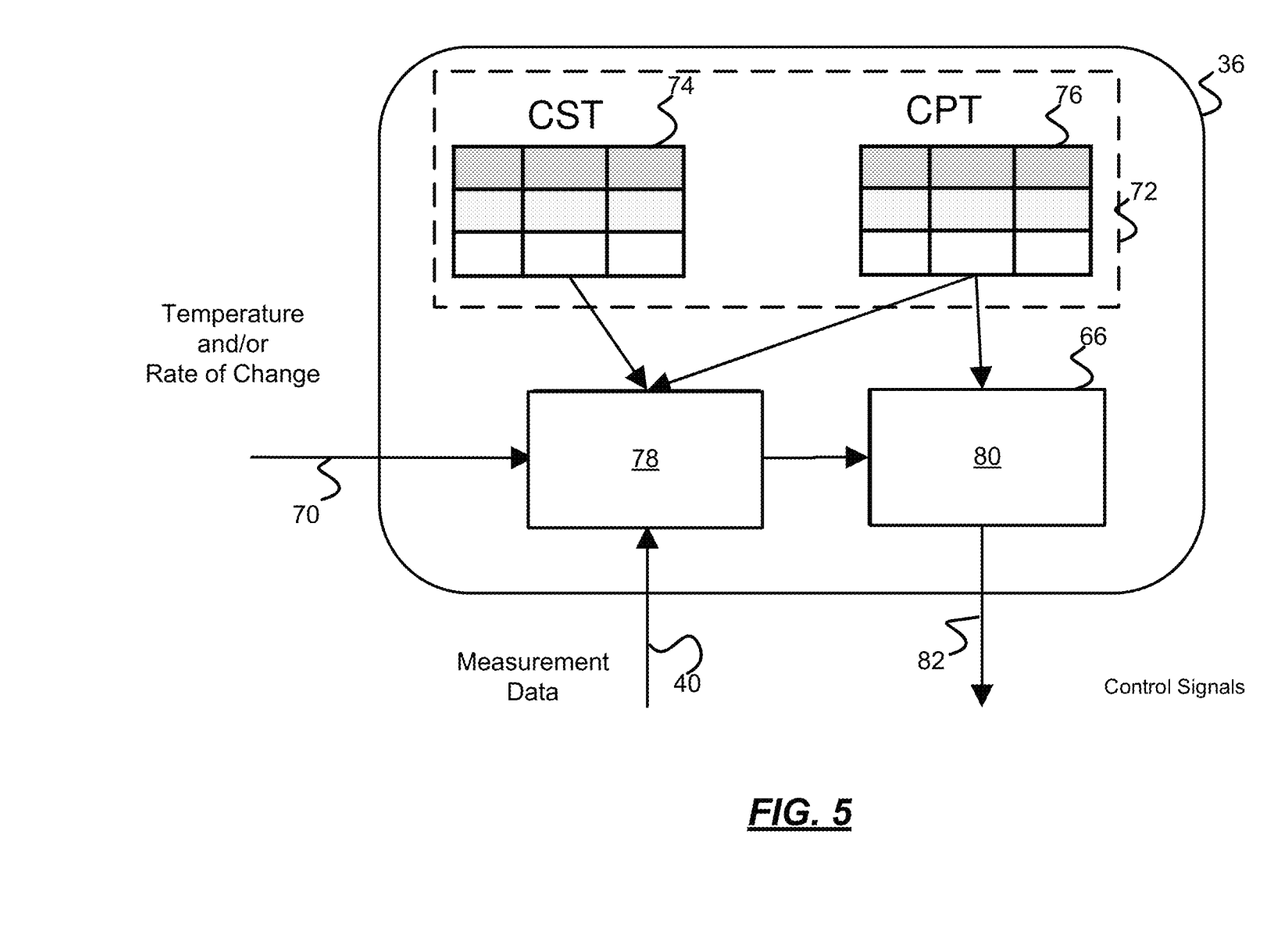

For example, as shown in more detail in FIG. 5, the policy datastore 72 may include a configuration selection table (CST) 74 and a configuration parameter table (CPT) 76. The CST 74 stores relations between current temperature, workload, predicted temperatures, temperature change speed, and a desired configuration (e.g., as discrete values <cur_temperature, cur_workload, pred_temperature, temp_change, des_configure>). The CPT 76 stores configuration parameters for actions of each user-defined policy (e.g., as discret values <config, off_runnables, off_tasks, rbl_rate, tsk_rate, freq>). The controller module 36 computes a CPT entry at 78 based on the CST 74 and measurement data 40. The controller module 36 generates control signals 82 to execute the selected configuration parameters at 80 based on the CPT entry. The configuration parameters are associated with actions that can include, but are not limited to, generate signals to control one or more of the cooling devices (e.g., activation, frequency, voltage adjustment) generate signals to control the processor itself to slow down processing, generate signals to the applications to deactivate runnables and/or tasks, generate signals to the applications to adjust rate, etc.

With reference back to FIG. 2, in various embodiments, the controller module 36 determines the actions and controls the actions based on a temperature control algorithm (shown in more detail in FIG. 7) that takes into account a hot or a cool status of tasks performed on the processors 18. For example, the temperature control algorithm selectively migrates tasks identified as 'hot' tasks to the backup processor 18b when the main processor 18a is determined to be hot.

Figure 6:
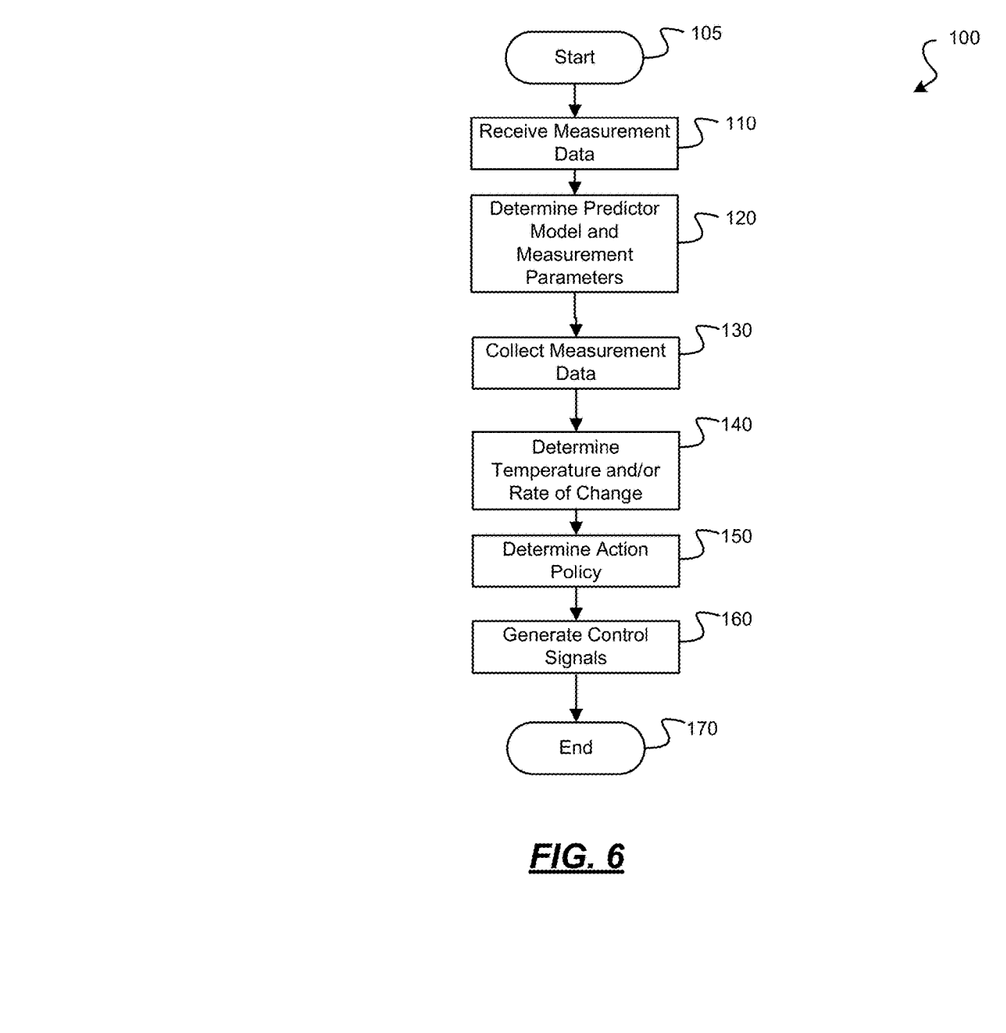
FIGS. 6 and 7 are flowcharts illustrating temperature control methods in accordance with various embodiments.

With reference now to FIG. 6, and with continued reference to FIGS. 1 through 5, a flowchart illustrates a method 100 for controlling the temperature of a processor 18 of a controller 14. The method can be implemented in connection with the vehicle 12 of FIG. 1 and can be performed by the temperature control system 10 of FIGS. 2-5, in accordance with various exemplary embodiments. As can be appreciated in light of the disclosure, the order of operation within the method 100 is not limited to the sequential execution as illustrated in FIG. 6, but may be performed in one or more varying orders as applicable and in accordance with the present disclosure. As can further be appreciated, the method 100 of FIG. 6 may be enabled to run continuously, may be scheduled to run at predetermined time intervals during operation of the vehicle 12 and/or may be scheduled to run based on predetermined events.

In various embodiments, the method may begin at 105. The measurement data 40 is received at 110. The measurement data 40 is evaluated by the predictor module 34 to determine the predictor model 62 and the measurement parameters 48 120. The measurement data 40 is collected based on the measurement parameters 48 and the request for data 46 at 130. The collected measurement data 40 is evaluated using the selected predictor model 62 to determine the temperature and/or the rate of change in temperature 70 at 140. The action policy is determined based on the measurement data 40 and the temperature and/or rate of change in temperature 70 at 150. The control signals 80 are generated to carry out the action(s) of the action policy at 160. Thereafter, the method may end at 170.

Figure 7:
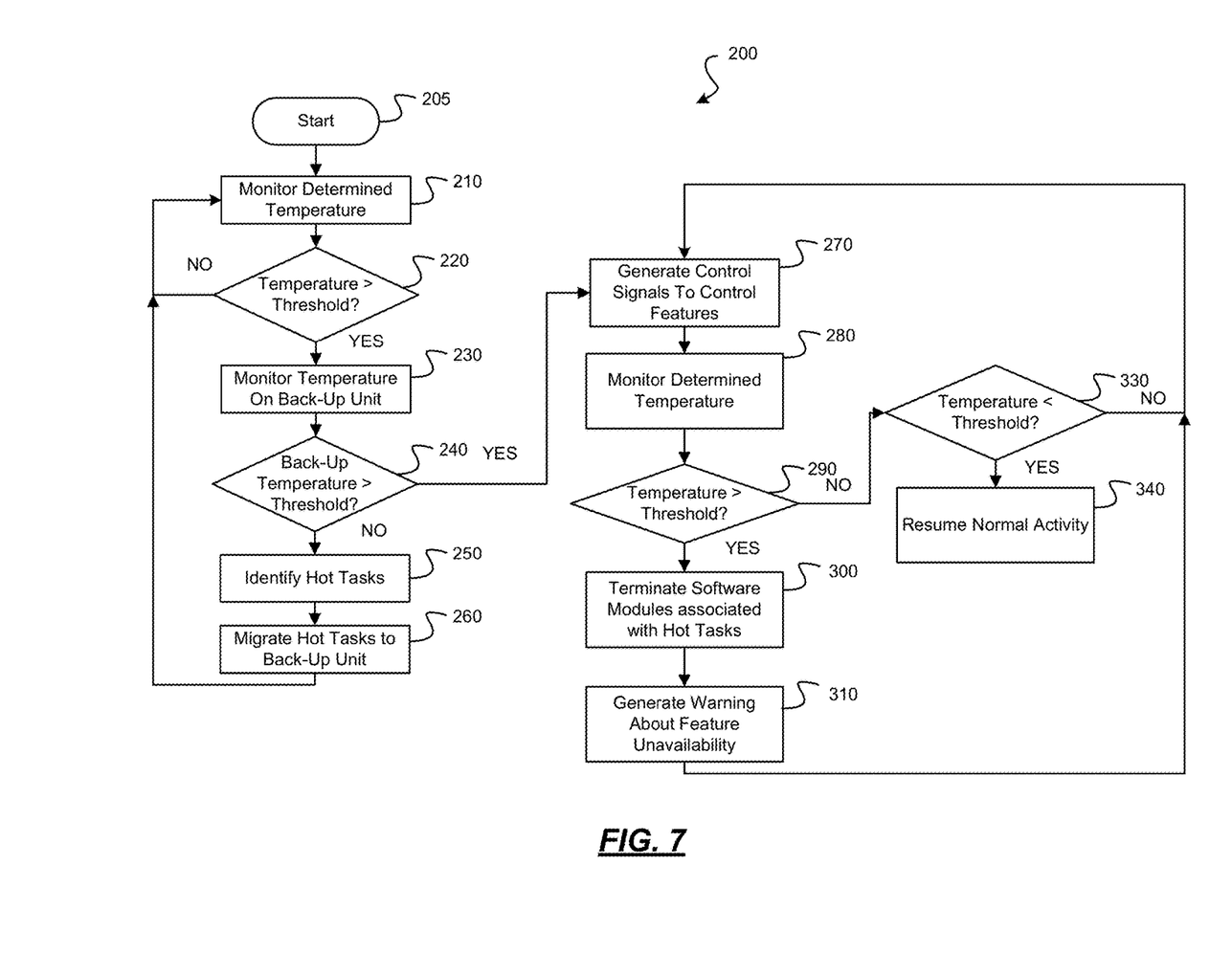

With reference now to FIG. 7, and with continued reference to FIGS. 1 through 5, a flowchart illustrates a method 200 for controlling the temperature of a processor 18 of a controller 14. The method can be implemented in connection with the vehicle 12 of FIG. 1 and can be performed by the temperature control system 10 of FIGS. 2-5, in accordance with various exemplary embodiments. As can be appreciated in light of the disclosure, the order of operation within the method 200 is not limited to the sequential execution as illustrated in FIG. 7, but may be performed in one or more varying orders as applicable and in accordance with the present disclosure. As can further be appreciated, the method 200 of FIG. 7 may be enabled to run continuously, may be scheduled to run at predetermined time intervals during operation of the vehicle 12 and/or may be scheduled to run based on predetermined events.

In various embodiments, the method may begin at 205. The temperature for the main processor 18a is monitored at 210. If the temperature does not exceed a threshold at 220, the method continues with monitoring the temperature of the main processor 18a at 210. If, however, the temperature exceeds the threshold (e.g., a first temperature threshold just below where damage can happen, to be proactive), the temperature of the backup processor 18b is monitored at 230. If the temperature of the backup processor 18b does not exceed a threshold (e.g., the same threshold as the first threshold or a different threshold particular to the backup processor 18b), the currently running tasks and/or upcoming tasks are identified and any hot tasks from the currently running tasks and/or upcoming tasks are selected at 250. The selected hot tasks are then migrated from the main processor 18a to the backup processor 18b at 260. Thereafter, the method continues with monitoring the determined temperature of the first processor at 210.

If, at 240, the temperature of the backup processor 18b exceeds the threshold at 240, control signals are generated to carry out one or more determined actions (e.g., controlling the fan or processors 18 as discussed above) at 270. Thereafter, the temperature of the main processor 18a is monitored at 280. If the main temperature exceeds a threshold (e.g., the same threshold as the first threshold or a second threshold) at 290, then software modules (i.e., the defined software module that includes the task) associated with the selected hot tasks are identified and terminated at 300 and warning signals are generated to a user or other control system notifying the recipient of the unavailability of the feature associated with the software module at 310. Thereafter, the method continues with generating control signals to carry out one or more determined actions at 270.

If, at 290. The temperature of the main processor 18a does not exceed the threshold at 290 and the temperature of the main processor 18a has not dropped below a threshold (e.g., a threshold indicating a safe operating temperature or other temperature), then control signals are generated to carry out one or more determined actions (e.g., controlling the fan or processors 18 as discussed above) at 270.

If, at 290. The temperature of the main processor 18a does not exceed the threshold at 290 and the temperature of the main processor 18a has dropped below a threshold (e.g., a threshold indicating a safe operating temperature or other temperature), then normal activity is resumed at 340 whereby tasks are scheduled on the main processor 18a and the backup processor 18b as usual.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a temperature of a first processor of a vehicle controller having the first processor and a second processor, comprising:
   collecting and storing, by the first processor, measurement data associated with the temperature of the first processor;
   associating, by the first processor, a status with each task of a plurality of software tasks, wherein the status is one of a hot task and a cold task, wherein the status identifies the software task's contribution to the temperature of the first processor; and
   selectively controlling, by the first processor, the execution of each task by one of the first processor or the second processor based on the associated status and the measurement data.

2. The method of claim 1, wherein the status of the task identifies an ability of the task to bring down the temperature of the first processor.

3. The method of claim 1, wherein the selectively controlling comprises migrating the task with an associated hot task status from the first processor to the second processor.

4. The method of claim 1, further comprising generating control signals to control a cooling device based on the associated status.

5. The method of claim 1, further comprising determining a temperature of the second processor of the vehicle controller and wherein the selectively controlling the temperature of the first processor is based on the temperature of the second processor.

6. The method of claim 1, further comprising terminating the execution of a software module on the first processor associated with the task with an associated hot task status.

7. The method of claim 6, further comprising generating a warning signal that includes a notification of an unavailability of a feature associated with the software module.

8. The method of claim 1, wherein the status identifies the software task's contribution to a temperature of memory associated with the first processor.

9. A system for controlling a temperature of a first processor of a vehicle controller having the first processor and a second processor, comprising:
   a non-transitory computer readable medium comprising:
   a first module that, by the first processor, collects measurement data associated with the temperature of the first processor;
   a second module that, by the first processor, selectively associates a status with each task of a plurality of software tasks, wherein the status is one of a hot task and a cool task, wherein the status identified the software task's contribution to the temperature of the first processor; and
   a third module that, by the first processor, selectively controls the execution of each task by one of the first processor or the second processor based on the associated status and the measurement data.

10. The system of claim 9, wherein the status of the task identifies an ability of the task to bring down the temperature of the first processor.

11. The system of claim 9, wherein the third module selectively controls by migrating the task with an associated hot task status from the first processor to the second processor.

12. The system of claim 11, wherein third module selectively controls by generating controls signals to control a cooling device based on the associated status.

13. The system of claim 9, further comprising a fourth module that determines a temperature of the second processor and wherein the third module selectively controls the temperature of the first processor based on the temperature of the second processor.

14. The system of claim 9, wherein the third module selectively controls the temperature of the first processor by terminating the execution a software module associated with the task with an associated hot task status.

15. The system of claim 14, wherein the third module generates a warning signal that includes a notification of an unavailability of a feature associated with the software module.

16. The system of claim 9, wherein the status identifies the software task's contribution to a temperature of memory associated with the first processor.

\* \* \* \* \*